(12) United States Patent
Petrmichl et al.

(10) Patent No.: US 10,279,565 B2
(45) Date of Patent: May 7, 2019

(54) VACUUM INSULATING GLASS WINDOW UNIT INCLUDING EDGE SEAL AND/OR METHOD OF MAKING THE SAME

(71) Applicant: Guardian Glass, LLC, Auburn Hills, MI (US)

(72) Inventors: Rudolph H. Petrmichl, Ann Arbor, MI (US); John P. Hogan, Northville, MI (US); Brad Pasionek, Saginaw, MI (US)

(73) Assignee: Guardian Glass, LLC, Auburn Hills, MI (US)

(*) Notice: Subject to any disclaimer, the term of this patent is extended or adjusted under 35 U.S.C. 154(b) by 341 days.

(21) Appl. No.: 15/041,412

(22) Filed: Feb. 11, 2016

(65) Prior Publication Data

US 2017/0232712 A1  Aug. 17, 2017

(51) Int. Cl.
| | |
|---|---|
| *B32B 17/06* | (2006.01) |
| *B32B 7/12* | (2006.01) |
| *E06B 3/673* | (2006.01) |
| *B32B 38/00* | (2006.01) |
| *E06B 3/66* | (2006.01) |
| *E06B 3/663* | (2006.01) |
| *E06B 3/677* | (2006.01) |
| *E06B 9/24* | (2006.01) |

(52) U.S. Cl.
CPC ............ *B32B 17/06* (2013.01); *B32B 7/12* (2013.01); *B32B 38/0008* (2013.01); *E06B 3/6612* (2013.01); *E06B 3/66304* (2013.01); *E06B 3/6736* (2013.01); *E06B 3/6775* (2013.01); *E06B 3/67334* (2013.01); *E06B 2009/2417* (2013.01); *Y02A 30/25* (2018.01); *Y02B 80/24* (2013.01)

(58) Field of Classification Search
CPC ....... C03B 23/245; C03B 27/00; C03B 17/02; C03B 17/064; C03B 23/203
See application file for complete search history.

(56) References Cited

U.S. PATENT DOCUMENTS

| | | | |
|---|---|---|---|
| 6,221,190 | B1 | 4/2001 | Shimosato et al. |
| 8,227,055 | B2 | 7/2012 | Wang |
| 2006/0042748 | A1 | 3/2006 | Hasegawa et al. |
| 2007/0114909 | A1* | 5/2007 | Park .................. H01L 51/5246 313/495 |
| 2012/0210750 | A1 | 8/2012 | Cooper et al. |
| 2012/0213952 | A1* | 8/2012 | Dennis .................... C03C 8/04 428/34 |

* cited by examiner

*Primary Examiner* — Jodi C Franklin
(74) *Attorney, Agent, or Firm* — Nixon & Vanderhye P.C.

(57) ABSTRACT

Methods of making a vacuum insulating glass (VIG) window unit, including edge sealing techniques relating to the same, are provided. Certain example embodiments relate to providing an infrared (IR) absorbing element(s) such as a clip or clamp proximate an edge portion of a VIG assembly during formation of an edge seal. The IR absorbing element(s) absorb applied IR radiation and heat up during an edge seal formation process. Because the IR absorbing element(s) is/are thermally conductive and in contact with at least one of the glass substrates the element(s) causes/cause heat to be transferred from the element(s) to the adjacent glass substrate(s) and to the adjacent edge seal material thereby helping the edge seal material to heat up faster during the edge seal formation process and keeping other areas of glass at lower temperatures.

20 Claims, 7 Drawing Sheets

VACUUM INSULATING GLASS WINDOW UNIT INCLUDING EDGE SEAL AND/OR METHOD OF MAKING THE SAME

FIELD OF THE INVENTION

Certain example embodiments of this invention relate to methods of making a vacuum insulating glass (VIG) window unit, including edge sealing techniques relating to the same. More particularly, certain example embodiments of this invention relate to providing an infrared (IR) absorbing element(s) such as a clip or clamp proximate an edge portion of a VIG assembly during formation of an edge seal.

BACKGROUND AND SUMMARY OF EXAMPLE EMBODIMENTS OF THE INVENTION

Vacuum IG window units are known in the art. For example, see U.S. Pat. Nos. 5,664,395, 5,657,607, and 5,902,652, the disclosures of which are all hereby incorporated herein by reference.

Figure 1:
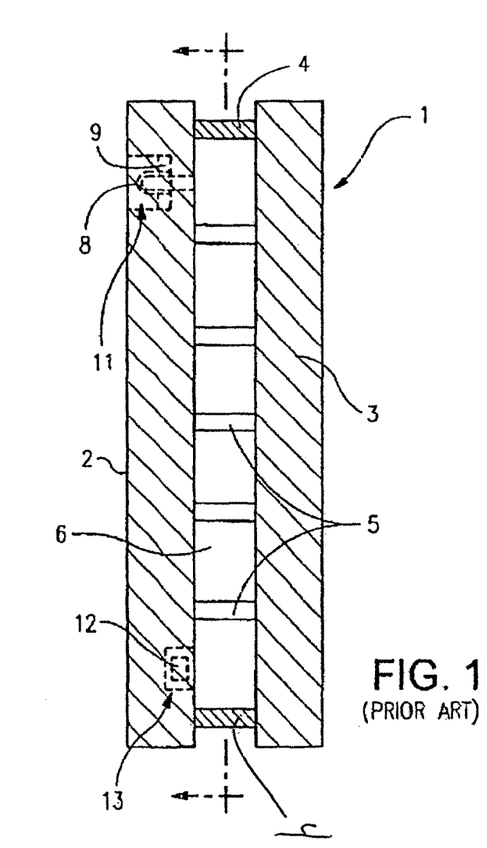
FIG. 1 is a prior art cross-sectional view of a conventional vacuum insulating glass (VIG) unit.
Figure 2:
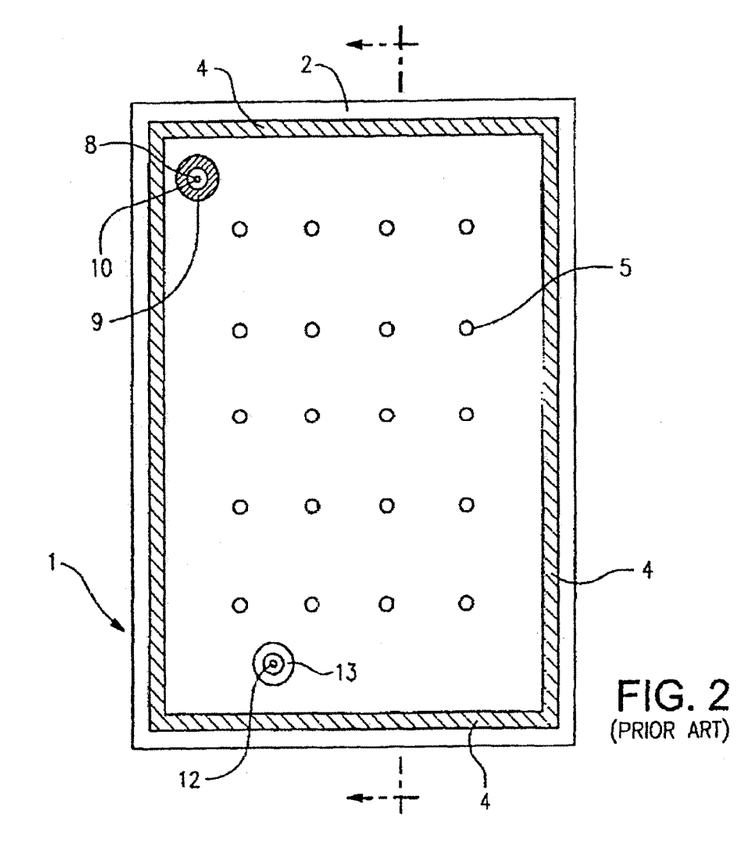
FIG. 2 is a prior art top plan view of the bottom substrate, edge seal, and spacers of the FIG. 1 VIG unit taken along the section line illustrated in FIG. 1.

FIGS. 1-2 illustrate a conventional vacuum IG unit (vacuum IG unit or VIG unit). Vacuum IG unit 1 includes two spaced apart glass substrates 2 and 3, which enclose an evacuated or low pressure space 6 therebetween. Glass sheets/substrates 2 and 3 are interconnected by peripheral or edge seal of fused solder glass 4 and an array of support pillars or spacers 5.

Pump out tube 8 is hermetically sealed by solder glass 9 to an aperture or hole 10 which passes from an interior surface of glass sheet 2 to the bottom of recess 11 in the exterior face of sheet 2. A vacuum is attached to pump out tube 8 so that the interior cavity between substrates 2 and 3 can be evacuated to create a low pressure area or space 6. After evacuation, pump-out tube 8 is melted to seal the vacuum. Recess 11 retains sealed tube 8. Optionally, a chemical getter 12 may be included within recess 13.

Conventional VIG units, with their fused solder glass peripheral seals 4, have been manufactured as follows. Glass frit in a solution (ultimately to form solder glass edge seal 4) is initially deposited around the periphery of glass substrate 2. The other glass substrate 3 is brought down over top of substrate 2 so as to sandwich spacers 5 and the glass frit/solution therebetween. The entire assembly including sheets 2, 3, the spacers 5, and the seal material is then heated to a temperature of approximately 500° C., at which point the glass frit melts, wets the surfaces of the glass sheets 2, 3, and ultimately forms hermetic peripheral or edge seal 4. This approximately 500° C. temperature is maintained for from about one to eight hours. After formation of the peripheral/edge seal 4 and the seal around tube 8, the assembly is cooled to room temperature. It is noted that column two of U.S. Pat. No. 5,664,395 states that a conventional vacuum IG processing temperature is approximately 500° C. for one hour. Inventor Collins of the '395 patent states in "Thermal Outgassing of Vacuum Glazing," by Lenzen, Turner and Collins, that "the edge seal process is currently quite slow: typically the temperature of the sample is increased at 200° C. per hour, and held for one hour at a constant value ranging from 430° C. and 530° C. depending on the solder glass composition." After formation of edge seal 4, a vacuum is drawn via the pump-out tube 8 to form low pressure space/gap/cavity 6.

Figure 3:
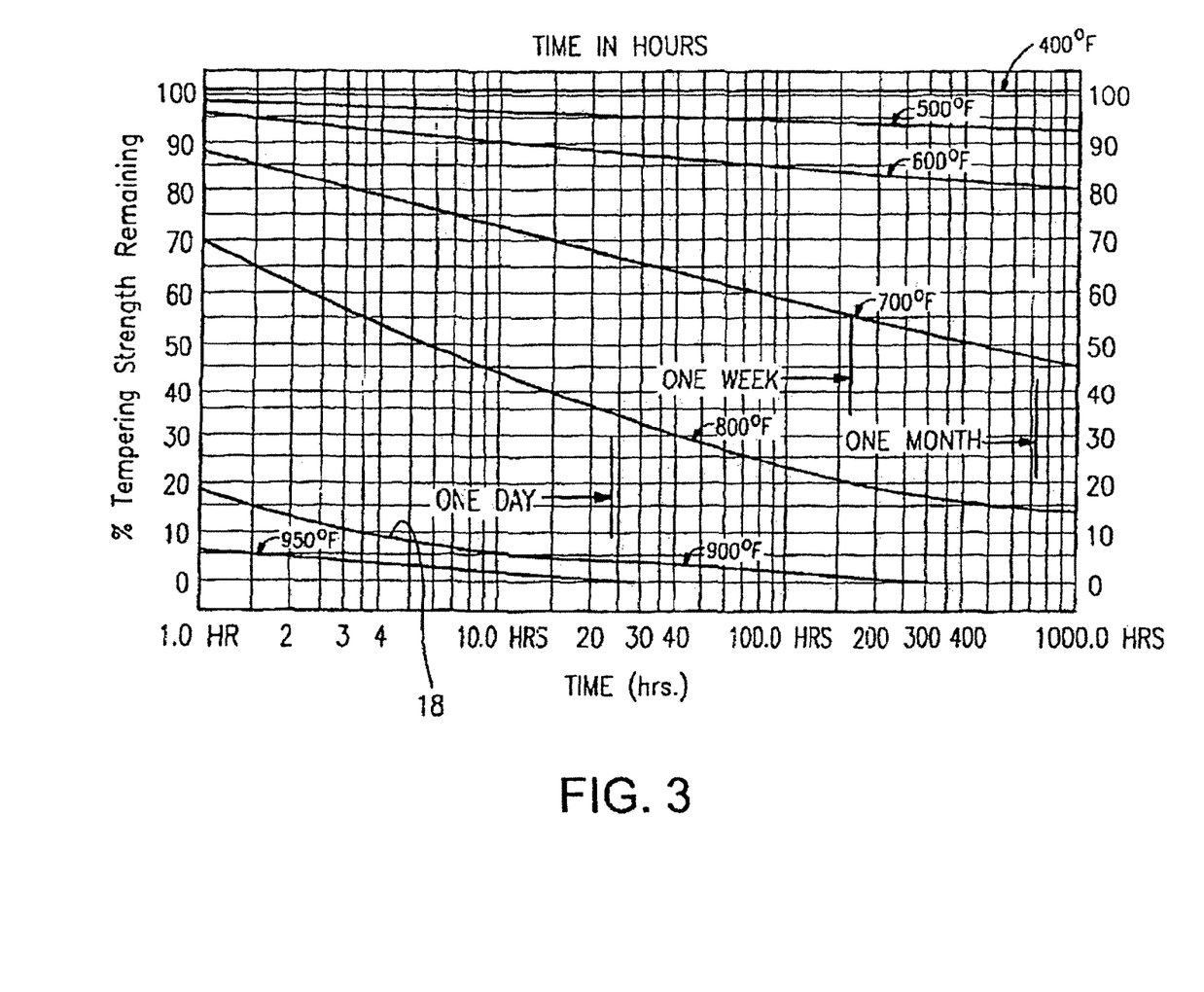
FIG. 3 is a graph correlating time (hours) versus percent tempering strength remaining, illustrating the loss of original temper strength for a thermally tempered sheet of glass after exposure to different temperatures for different periods of time.
Figure 4:
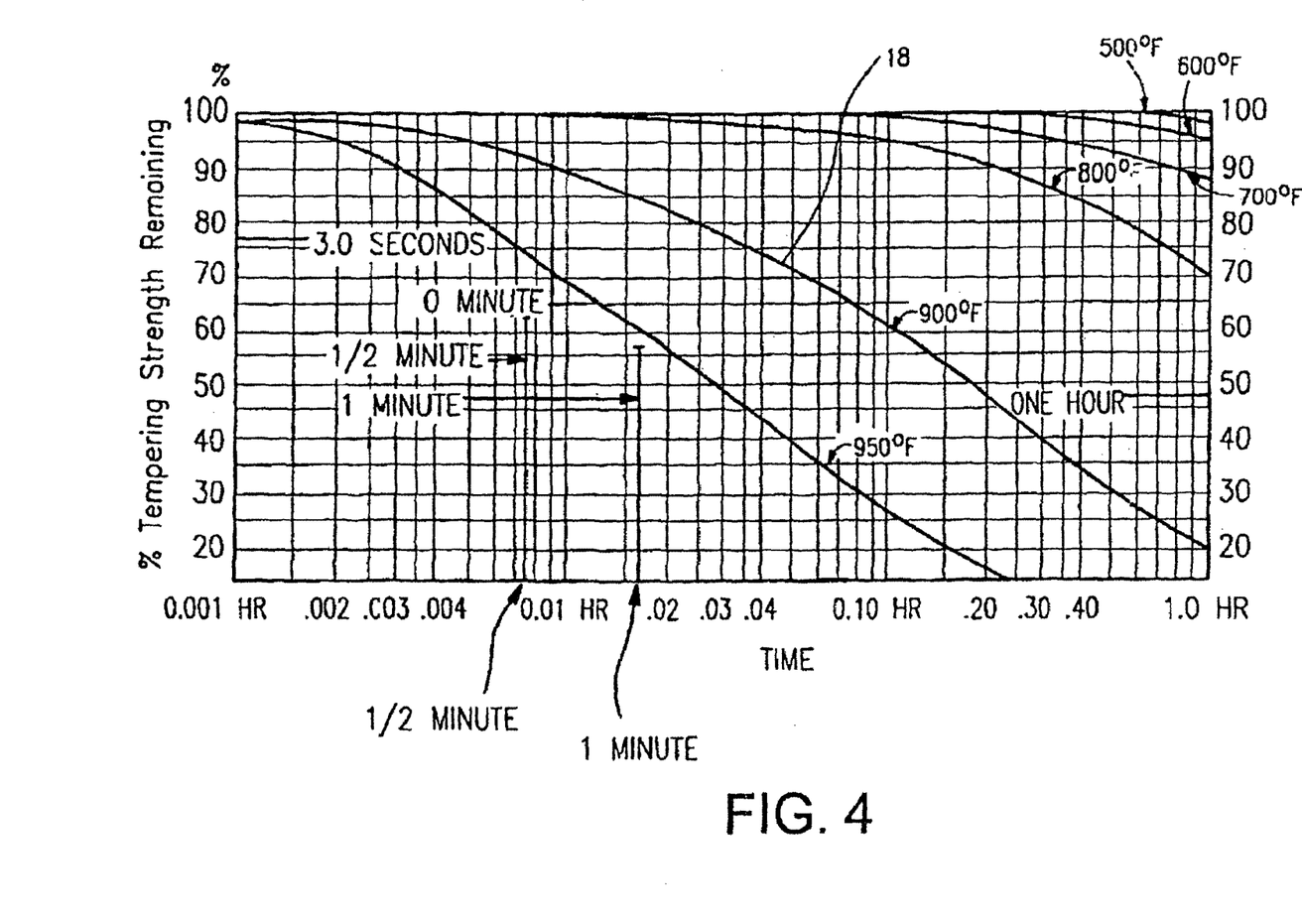
FIG. 4 is a graph correlating time versus percent tempering strength remaining similar to that of FIG. 3, except that a smaller time period is provided on the x-axis.

Unfortunately, the aforesaid high temperatures and long heating times of the entire VIG assembly utilized in the formulation of edge seal 4 are undesirable, especially when it is desired to use a heat strengthened or tempered glass substrate(s) 2, 3 in the VIG unit. As shown in FIGS. 3-4, tempered glass loses temper strength upon exposure to high temperatures as a function of heating time. Moreover, such high processing temperatures may adversely affect certain low-E coating(s) that may be applied to one or both of the glass substrates in certain instances.

FIG. 3 is a graph illustrating how fully thermally tempered plate glass loses original temper upon exposure to different temperatures for different periods of time, where the original center tension stress is 3,200 MU per inch. The x-axis in FIG. 3 is exponentially representative of time in hours (from 1 to 1,000 hours), while the y-axis is indicative of the percentage of original temper strength remaining after heat exposure. FIG. 4 is a graph similar to FIG. 3, except that the x-axis in FIG. 4 extends from zero to one hour exponentially.

Seven different curves are illustrated in FIG. 3, each indicative of a different temperature exposure in degrees Fahrenheit (° F.). The different curves/lines are 400° F. (across the top of the FIG. 3 graph), 500° F., 600° F., 700° F., 800° F., 900° F., and 950° F. (the bottom curve of the FIG. 3 graph). A temperature of 900° F. is equivalent to approximately 482° C., which is within the range utilized for forming the aforesaid conventional solder glass peripheral seal 4 in FIGS. 1-2. Thus, attention is drawn to the 900° F. curve in FIG. 3, labeled by reference number 18. As shown, only 20% of the original temper strength remains after one hour at this temperature (900° F. or 482° C.). Such a significant loss (i.e., 80% loss) of temper strength is of course undesirable.

In FIGS. 3-4, it is noted that much better temper strength remains in a thermally tempered glass substrate when it is heated to a temperature of 800° F. (about 428° C.) for one hour as opposed to 900° F. for one hour. Such a glass sheet retains about 70% of its original temper strength after one hour at 800° F., which is significantly better than the less than 20% when at 900° F. for the same period of time. Thus, exposing the entire glass substrates to high temperatures typically causes them to lose at least some of the strength provided during heat treatment (HT). For example, tempered soda lime glass substrates sometimes actually may significantly de-temper at high temperatures.

Another advantage associated with not heating up the entire unit for too long is that lower temperature spacer/pillar materials may then be used. This may or may not be desirable in some instances.

Even when non-tempered glass substrates are used, the high temperatures applied to the entire VIG assembly may melt the glass or introduce stresses. These stresses may increase the likelihood of deformation of the glass and/or breakage.

Thus, it will be appreciated that there is a need in the art for a VIG unit, and corresponding method of making the same, where a structurally sound hermetic edge seal may be provided between opposing glass sheets. There also exists a need in the art for a VIG unit including tempered glass sheets, wherein the peripheral seal is formed such that the glass sheets retain more of their original temper strength than with a conventional vacuum IG manufacturing technique where the entire unit is heated in the same manner in order to form an edge seal.

Certain example embodiments of this invention relate to providing an infrared (IR) absorbing element(s) such as a clip or clamp proximate an edge portion of a VIG assembly during formation of an edge seal. The IR absorbing element(s) directly contacts at least one of the glass substrates of the assembly, which glass substrates may be thermally tempered. The IR absorbing element(s) proximate the edge portion of the VIG assembly, and proximate the edge seal material, is thermally conductive and absorbs more IR than does the glass or edge material alone. Thus, the IR absorbing element(s) absorb applied IR radiation and heat up during an edge seal formation process, and because the element(s) is/are thermally conductive and in contact with at least one of the glass substrates the element(s) causes/cause heat to be transferred from the element(s) to the adjacent glass substrate(s) and to the adjacent edge seal material thereby helping the edge seal material to heat up faster during the edge seal formation process. This localized heating of the edge seal area proximate the perimeter of the assembly and proximate the IR absorbing element(s) causes a thermal differential across the assembly so that during the edge seal formation process the temperatures of the glass substrate(s) are higher proximate the edge seal area than at other areas across the assembly such as a central area of the VIG assembly. This allows heat to be concentrated in areas where the frit material is to be melted in order to form the edge seal. The reduced temperatures at other areas (e.g., central area) of the VIG assembly allow the glass substrates (e.g., thermally tempered glass substrates) to retain more strength compared to if the entire assembly were equally heated to the same high temperatures, and/or allows the edge seal to be formed in a shorter period of time.

In certain example embodiments of this invention, there is provided a method of making a vacuum insulating glass (VIG) window unit, the method comprising: having a VIG assembly including first and second substantially parallel spaced-apart glass substrates with a plurality of spacers therebetween, the first and second glass substrates each including one or more edge portions to be sealed, a frit for forming an edge seal being provided at least partially between the first and second glass substrates; providing a plurality of infrared (IR) absorbing clamps around a peripheral area of the VIG assembly, the IR absorbing clamps clamping the first and second glass substrates together and overlapping at least part of the frit for forming the edge seal; and directing IR energy from at least one IR source toward the frit for forming the edge seal and toward the IR absorbing clamps during a process of melting the frit so as to form the edge seal, the IR absorbing clamps absorbing IR radiation from the at least one IR source and transferring heat to at least one of the glass substrates and to the frit in order to help melt the frit when forming the edge seal.

In certain example embodiments of this invention, there is provided vacuum insulating glass (VIG) assembly, comprising: first and second substantially parallel spaced-apart glass substrates with a plurality of spacers therebetween, wherein the first and second substrates each include one or more edge portions to be sealed; a frit provided at least partially between the first and second glass substrates for sealing said one or more edge portions to be sealed, and a plurality of infrared (IR) absorbing clamps at a peripheral area of the VIG assembly, the IR absorbing clamps clamping the first and second glass substrates together and overlapping at least part of the frit for forming the edge seal.

The features, aspects, advantages, and example embodiments described herein may be combined to realize yet further embodiments.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION OF EXAMPLE EMBODIMENTS OF THE INVENTION

Referring now more particularly to the accompanying drawings in which like reference numerals indicate like parts throughout the several views.

Certain embodiments of this invention relate to an improved peripheral or edge seal in a vacuum IG window unit, and/or a method of making the same. "Peripheral" and "edge" seals herein do not mean that the seals are necessarily located at the absolute periphery or edge of the unit, but instead mean that the seal is at least partially located at or near (e.g., within about two inches) an edge of at least one substrate of the unit. Likewise, "edge" as used herein is not limited to the absolute edge of a glass substrate but also may include an area at or near (e.g., within about two inches) of an absolute edge of the substrate(s). Also, it will be appreciated that as used herein the term "VIG assembly" refers to an intermediate product prior to the VIG's edges being sealed and evacuation of the recess including, for example, two parallel-spaced apart substrates and a frit. Also, while the frit may be said to be "on" or "supported" by one or more of the substrates herein, this does not mean that the frit must directly contact the substrate(s). In other words, the word "on" covers both directly and indirectly on, so that the frit may be considered "on" a substrate even if other material (e.g., a coating and/or thin film) is provided between the substrate and the frit.

Certain example embodiments of this invention advantageously shorten the process time involved in certain aspects of the forming of an edge seal from hours to minutes. Certain example embodiments of this invention also advantageously allow the substrates in the final VIG product to maintain more of their HT strength (e.g., temper strength), while also simplifying manufacturing setup.

Certain example embodiments involve providing IR absorbing elements, such as clips/clamps, at the periphery of a VIG assembly during the edge seal forming process. As explained herein, this enables the frit for forming the edge seal to heat up faster than other parts of the assembly during the edge sealing process. This will provide certain example advantages to the VIG unit manufacturing process.

Example embodiments of this invention relate to methods of making a vacuum insulating glass (VIG) window unit, including edge sealing techniques relating to the same. Example embodiments of this invention relate to providing an infrared (IR) absorbing element(s) such as a clips/clamps 25 (or 25') proximate an edge portion of a VIG assembly during formation of an edge seal 4. The IR absorbing element(s) 25 directly contact at least one of the glass substrates 2, 3 of the VIG assembly, which glass substrates 2, 3 are often thermally tempered. The edge seal 4 is typically formed by heating edge seal material such as frit or the like. The frit 4 needs to be melted in order to bond the glass substrates 2, 3 to each other and form the hermetic edge seal 4. And in order to maintain substantial strength of thermally tempered glass substrates 2, 3, overall heating of the overall glass substrates should be minimized as discussed above but in a manner which still allows periphery areas and the frit to reach high temperatures sufficient to melt the frit and form the seal 4. Selective heating of the frit is achieved by using an IR source(s) and by providing the IR absorbing element(s) 25 proximate the edge portion of the VIG assembly, and proximate the edge seal material. The IR absorbing element(s) 25 is/are thermally conductive and absorbs more IR than does the glass 2, 3 or edge material alone. Thus, the IR absorbing element(s) 25 absorb applied IR radiation 27 and heat up during an edge seal formation process, and because the element(s) 25 is/are thermally conductive and in contact with at least one of the glass substrates the element(s) 25 causes/cause heat to be transferred from the element(s) 25 to the adjacent glass substrate(s) 2, 3 and to the adjacent edge seal material thereby helping the edge seal material to heat up faster to melt/cure during formation of the edge seal 4. The IR absorbing clips/clamps 25 (25') are spring biased toward a closed position, and therefore also help to hold the glass substrates 2, 3 together and in place during the edge seal 4 forming process. The localized heating of the edge seal area proximate the perimeter of the VIG assembly and proximate the IR absorbing element(s) 25 causes a thermal differential across the VIG assembly so that during the edge seal formation process the temperatures of the glass substrate(s) 2, 3 are higher proximate the peripheral edge seal area than at other areas across the assembly such as a central area 29 of the VIG assembly. This allows heat to be concentrated in peripheral areas of the VIG assembly where the frit material is to be melted in order to form the edge seal 4. The reduced temperatures at other areas including central area 29 of the VIG assembly allow the glass substrates (e.g., thermally tempered glass substrates) 2, 3 to retain more strength compared to if the entire assembly were equally heated to the same high temperatures, and/or allows the edge seal 4 to be formed in a shorter period of time. The techniques of certain example embodiments may make it possible to expose some or all of the VIG intermediate assembly to IR source(s) 31, since the frit will heat up faster than central portions of the glass substrates distant from the assembly's periphery thereby reducing the likelihood of the glass substrates 2, 3 losing heat treatment (HT) strength (e.g., temper strength). The result may be a stronger and more durable VIG window unit.

Figure 5:
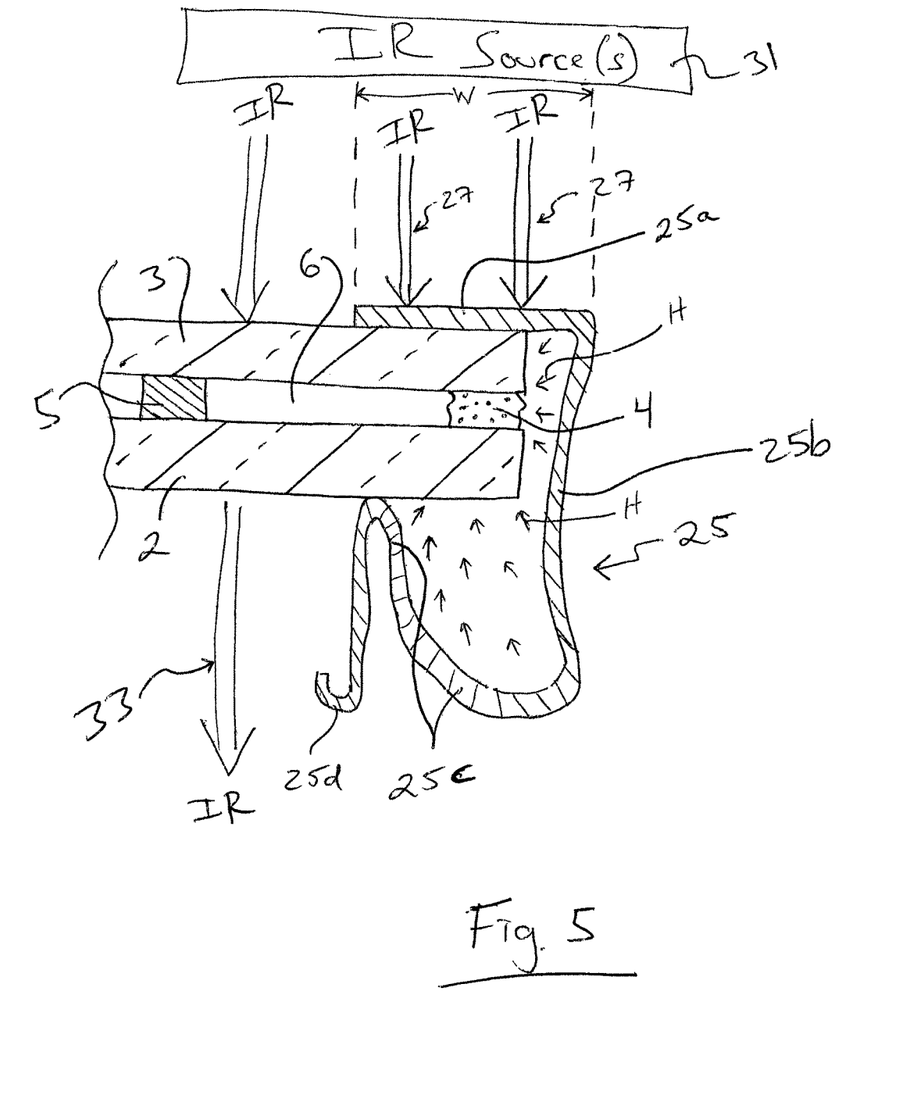
FIG. 5 is a cross sectional view of part of a VIG assembly during an edge seal forming process according to an example embodiment of this invention.
Figure 6:
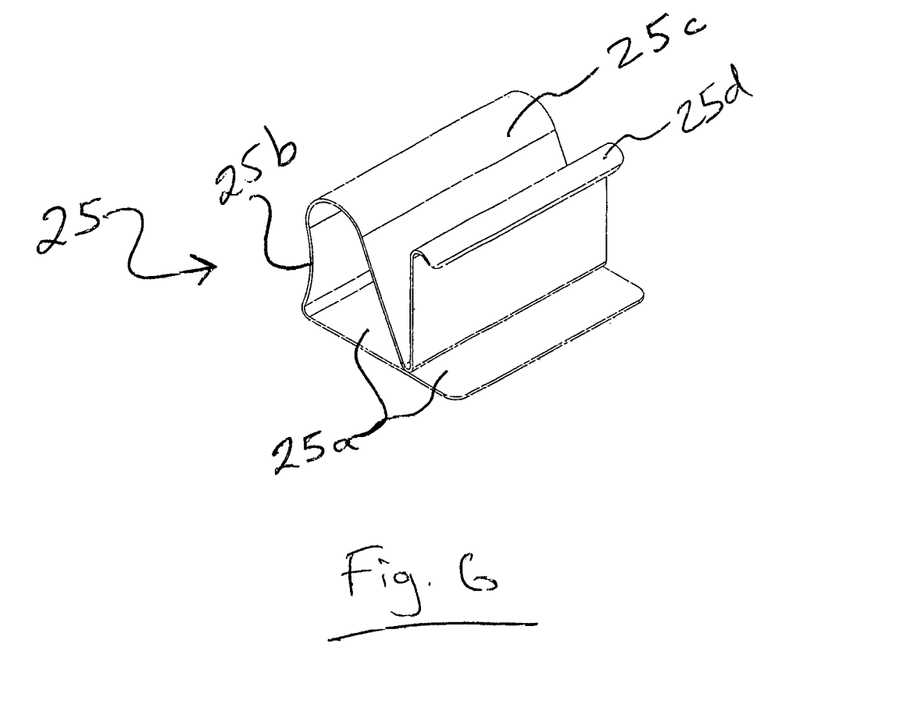
FIG. 6 is a perspective view of the IR absorbing clip/clamp of FIG. 5.
Figure 7:
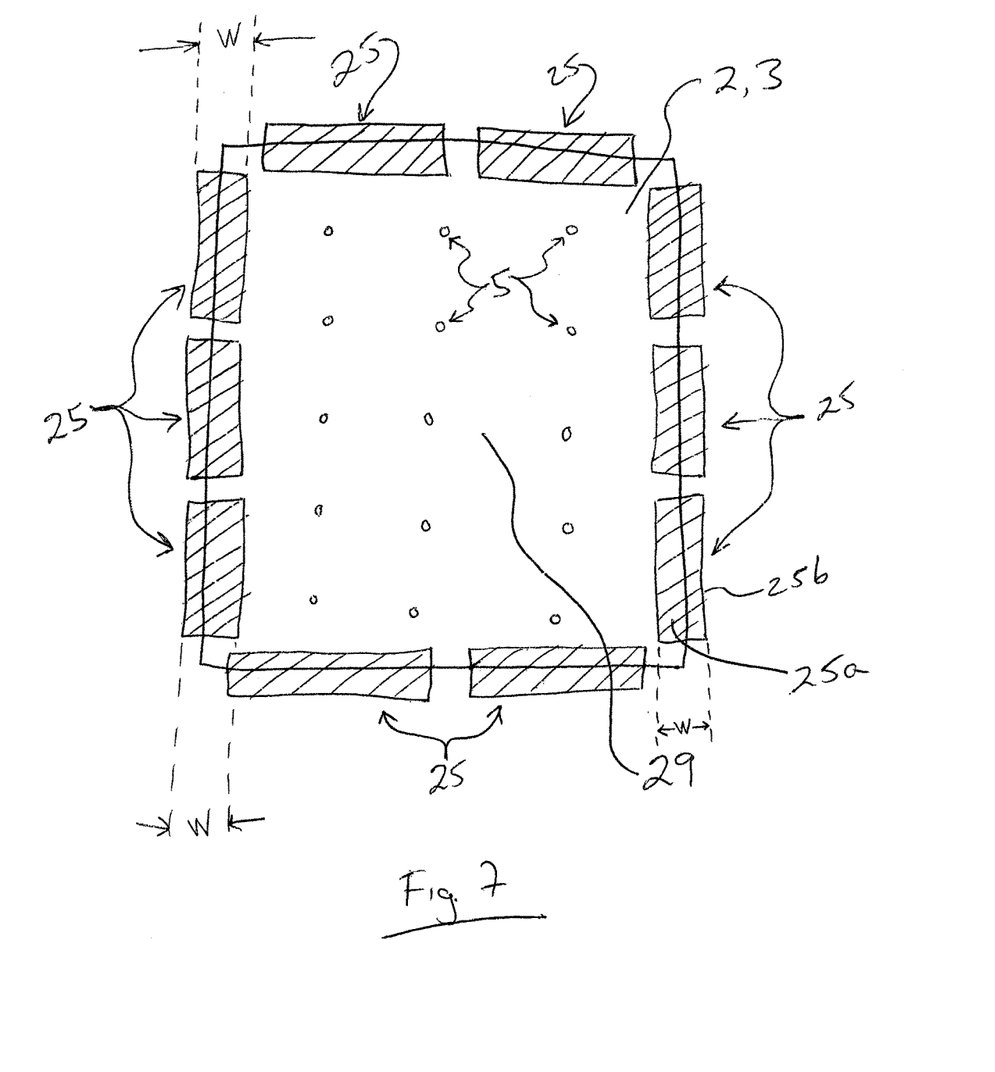
FIG. 7 is top plan view of the VIG assembly of FIG. 5 during an edge seal forming process.

Referring to the embodiment of FIGS. 5-7, FIG. 5 is a cross sectional view of part of a VIG assembly during an edge seal forming process, FIG. 7 is top plan view of the VIG assembly of FIG. 5 during the edge seal forming process, and FIG. 6 is a perspective view of the IR absorbing clips/clamps of FIGS. 5 and 7. As discussed herein, the VIG assembly includes glass substrates (e.g., soda-lime-silica based float glass) 2 and 3 with a plurality of spacers 5 provided therebetween for spacing the glass substrates 2, 3 from each other. Frit material 4 for forming the edge seal is also provided between the glass substrates 2 and 3 proximate the peripheral edge portion of the VIG assembly (as best shown perhaps in FIGS. 1-2 and 5). The frit is heated to high temperature(s) (e.g., 400-600 degrees C. for instance) in order to melt the frit and form the hermetic edge seal 4 between the glass substrates 2 and 3.

One or more IR absorbing elements(s) 25 such as clamps/clips are provided at the periphery of the VIG assembly. Clamps/clips 25 shown in FIGS. 5-7 are spring-biased toward a closed position so as to clamp the glass substrates 2, 3 in place and hold them together during the edge seal forming process. FIG. 6 illustrates a clamp/clip 25 in the closed position when it is not around the glass substrates, whereas FIGS. 5 and 7 illustrate the clamps/clips 25 in clamping position on the VIG assembly around the glass substrates 2, 3. Clamps/clips 25 include base portion 25a that is substantially parallel to and contacting glass substrate 3 for heat transfer purposes, wall portion 25b extending upwardly from the base portion 25a and provided between the base portion 25a and curved clamping portion 25c, and hook-shaped distal end portion 25d adapted to receive force (e.g., from a clip or metal member) to bias the clamping portion away from the glass substrates 2, 3 when fitting the clamp over and onto the glass substrates 2, 3. Clamps/clips 25 are spring biased due to their material and shape toward the closed position as shown in FIG. 6. However, the clamps/clips 25 can be opened from the FIG. 6 position by applying force to end portion 25d and possibly base 25a in order to open the clamp and allow the glass substrates 2, 3 to fit therein, and when the force is released the clamps/clips 25 clamp the substrates 2, 3 in place and hold them together as shown in FIGS. 5 and 7. Thus, the clamps/clips 25 serve the purpose of absorbing IR radiation for heating up the glass and adjacent frit 4 as discussed herein, and also serve the purpose of holding the glass substrates 2, 3 together and in place during the edge seal forming process. The IR absorbing clamps/clips 25 absorb IR radiation from at least one IR source(s) and transfer energy (e.g., heat) to one or both of the glass substrates and thus to the frit in order to help melt the frit when forming the edge seal 4. The clamps/clips 25 may transfer their absorbed energy to the glass and/or to the frit in any suitable manner, such as through conduction to the adjacent glass or through re-radiation at a different wavelength (e.g., shorter wavelengths), or a combination of these. For instance, FIG. 7 illustrates that a plurality of IR absorbing clamps/clips 25 are provided at the periphery of the VIG assembly, including multiple clamps on each of the four sides. In certain example embodiments, a plurality of IR absorbing clamps/clips 25 are used at the periphery and at least 50% of the surface area where the frit bead 4 is located is covered by clamps/clips 25 (more preferably at least 60%, and most preferably at least 70%).

After the clamps/clips 25 are in place as shown in FIGS. 5 and 7 around the periphery of the VIG assembly, localized IR source(s) 31 direct IR radiation 27 toward the VIG assembly (at least toward the peripheral area thereof). While localized IR source(s) may be used in preferred embodiments, general non-localized IR source(s) may be used in other example embodiments. Although IR source(s) 31 may emit a wavelength of 1000 nm in example embodiments, it will be appreciated that infrared (IR) energy irradiated at or proximate to the glass frit in the edge sealing process may be in the range of, for example, 0.9-1.2 microns. Certain example embodiments may provide localized heating to and/or IR heating as disclosed in, for example, application Ser. Nos. 12/000,663 and 12/000,791, the entire contents of each which are hereby incorporated herein by reference. IR radiation that does not hit the clamps/clips 25 largely passes through the assembly as shown at 33 and does not significantly help heat the frit. This is because float glass 2, 3 is largely transparent to IR wavelengths, typically absorbing less than 20% of such available energy of the near IR spectrum. But IR absorbing clamps/clips 25 absorb IR radiation 27 and transfer the heat H from same to the adjacent glass substrates 2, 3 and thus to the adjacent frit 4. The base portion 25a is parallel to the glass substrate 3 and contacts a large portion thereof over the frit 4 and thereby is particularly good at transferring heat to the glass substrate 3 and to the adjacent frit 4. Flat base portion 25a is thus advantageously positioned on the same side of the assembly as the IR source 31. This allows the periphery of the VIG assembly to heat up more quickly than the rest of the VIG assembly, thereby allowing the edge seal 4 to be formed more quickly and/or without the central portion of the assembly having to heat up as much as the periphery. By providing IR absorbing material 25 (or 25') in contact with one or both of the glass substrates 2, 3 at the edge seal area proximate the frit, which IR absorbing material is wider than the frit bead and thermally conductive, the IR is absorbed and heat transferred to the glass and to the frit for efficient heating/melting as discussed herein for forming the edge seal 4. The clamps 25 have the added benefit of applying pressure to compress the frit to a desired height and hold the glass substrates 2, 3 in place during the heating process. The result is retained temper strength of the glass substrates 2, 3 and an more durable VIG window unit.

While float glass 2, 3 is largely transparent to IR wavelengths and absorbs less than 20% of such available energy of the near IR spectrum (0.9 to 1.2 microns), the material of absorbing elements 25 (25') is very absorbing of near-IR radiation. In certain example embodiments, the IR absorbing elements 25 (25') absorb (as opposed to transmit or reflect) at least about 50% (more preferably at least about 60%, and most preferably at least about 70%) of the radiation in the near-IR spectrum from 0.9 to 1.2 microns. By making the width "W" of the absorbing elements 25 (25') at least twice as large as the width of the overlapped bead of frit material 4, the elements 25 (25') can absorb significantly more IR radiation than can the frit bead alone and thus can enable the glass at the assembly periphery and the frit itself to be heated up much faster in an advantageous manner.

After the hermetic edge seal 4 has been formed, the IR absorbing clips/clamps 25 are removed and the interior gap/cavity 6 is evacuated to a pressure less than atmospheric pressure as discussed above via a pump-out tube or the like.

The frit material 4 used to form the edge seal 4 may be glass type frit such as solder glass frit, or of other frit material (e.g., vanadium inclusive frit material) in example embodiments of this invention. For example, any of the frit materials disclosed in any of U.S. Patent Documents 2012/0213953 or 2012/0213951 (the disclosures of which are hereby incorporated herein by reference) may be used for the frit material for forming edge seals 4 herein. An example edge seal material 4 is of or includes a composition (wt. %) as follows: vanadium oxide from about 50% and 60%, barium oxide from about 15% to 33% weight, and zinc oxide from about 7-15%, with the frit material composition optionally including 1-10% of one or more of $Ta_2O_5$, $Ti_2O_3$, $SrC_{12}$, $GeO_2$, $CuO$, $AgO$, $Nb_2O_5$, $B_2O_3$, $MgO$, $SiO_2$, $TeO_2$, $Tl_2O_3$, $Y_2O_3$, $SnF_2$, $SnO_2$, $CuCl$, $SnCl_2$, $CeO_2$, $AgCl$, $In_2O_3$, $SnO$, $SrO$, $MgO$, and/or $Al_2O_3$. When vanadium based frit is used to form the edge seal, oxides of vanadium, barium and zinc may be the largest three elements of the frit material.

Thermally conductive IR absorbing elements 25 (or 25') may be made of any suitable IR absorbing material, such as stainless steel (e.g., type 17-7 PH stainless steel) or Inconel, in example embodiments of this invention. In certain example embodiments, IR absorbing clips/clamps 25 (25') may be Ni or NiCr based and may be of or include: from about 45-80% Ni (more preferably from about 48-75%, and most preferably from about 50-72% Ni); from about 8-35% Cr (more preferably from about 10-30%, and most preferably from about 13-27% Cr); from about 1-14% Fe (more preferably from about 2-12%, and most preferably from about 4-10% Fe); and may include small amounts of other elements such as Mo, Nb, Co, Si and/or the like.

Figure 8:
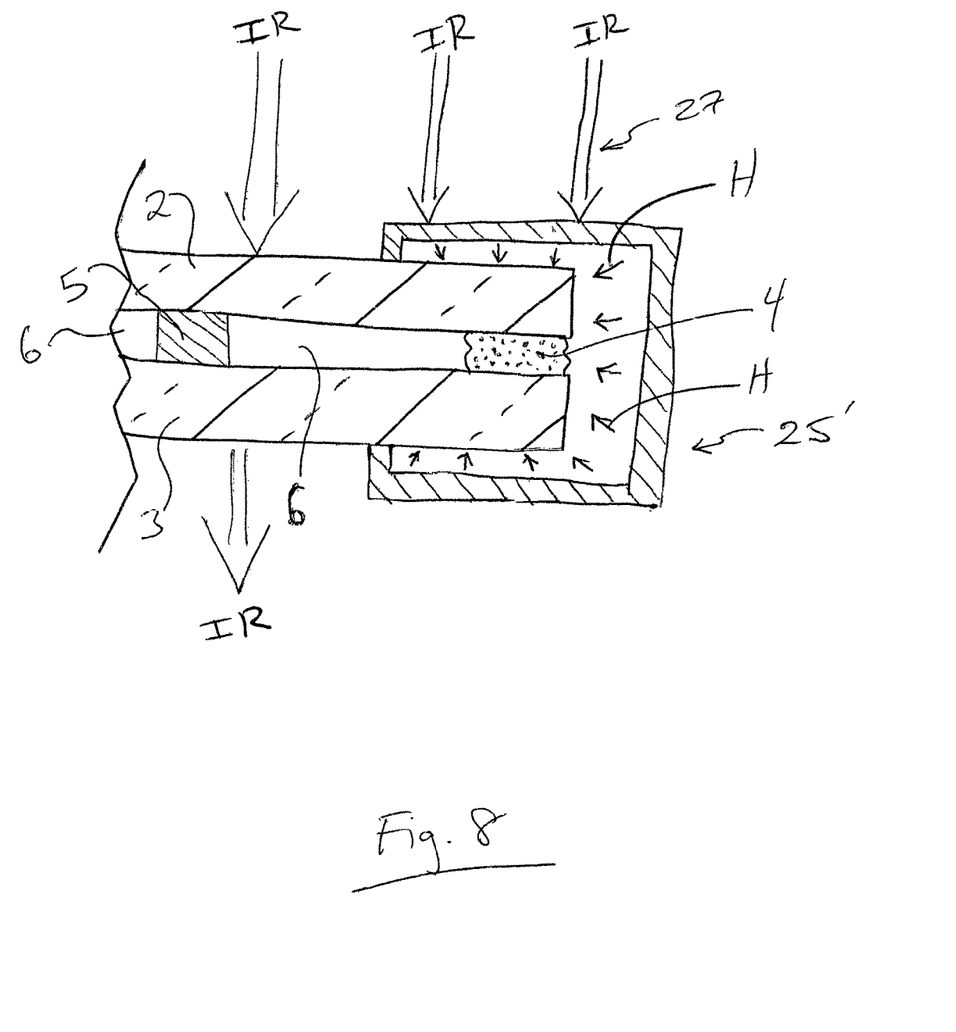
FIG. 8 is a cross sectional view of part of a VIG assembly during an edge seal forming process according to another example embodiment of this invention, where the FIG. 8 embodiment differs from the FIG. 5-7 embodiment in that different IR absorbing clips/clamps are utilized.

FIG. 8 is a cross sectional view of part of a VIG assembly during an edge seal forming process according to another example embodiment of this invention. The FIG. 8 embodiment differs from the FIG. 5-7 embodiment in that different IR absorbing clips/clamps/brackets 25' are utilized. The FIG. 8 clamps/clips/brackets 25' are used in the same manner discussed above in connection with FIGS. 5-7, except that they have a different shape and may or may not be spring biased toward a closed position.

While biased clamps 25 (or 25') are spring biased in embodiments discussed above, it is possible to provide the bias or clamping effect by way of other types of bias. For example, mechanical bias (e.g., via a threaded member or the like, as with a vice), hydraulic bias, or the like may be utilized instead of or in addition to spring bias.

It will be appreciated that the example embodiments described herein may be used in connection with a variety of different VIG assembly and/or other units or components. For example, the substrates may be glass substrates, heat strengthened substrates, tempered substrates, etc.

In an example embodiment of this invention there is provided a method of making a vacuum insulating glass (VIG) window unit, the method comprising: having a VIG assembly including first and second substantially parallel spaced-apart glass substrates with a plurality of spacers therebetween, the first and second glass substrates each including one or more edge portions to be sealed, a frit for forming an edge seal being provided at least partially between the first and second glass substrates; providing a plurality of infrared (IR) absorbing clamps around a peripheral area of the VIG assembly, the IR absorbing clamps clamping the first and second glass substrates together and overlapping at least part of the frit for forming the edge seal; and directing IR energy from at least one IR source toward the frit for forming the edge seal and toward the IR absorbing clamps during a process of melting the frit so as to form the edge seal, the IR absorbing clamps absorbing IR radiation from the at least one IR source and transferring energy (e.g., heat) to at least one of the glass substrates and to the frit in order to help melt the frit when forming the edge seal.

In the method of the immediately preceding paragraph, the IR absorbing clamps may directly contact one or both of the glass substrates.

In the method of any of the immediately preceding two paragraphs, the IR absorbing clamps may each have a width W at least as large as a width of the frit, and preferably a width W at least twice as large as a width of the frit.

In the method of any of the immediately preceding three paragraphs, the IR absorbing clamps may be spring biased toward a closed position so that when attached to the VIG assembly the clamps hold the first and second glass substrates together during formation of the edge seal.

In the method of any of the immediately preceding four paragraphs, the IR absorbing clamps may be made of material that absorbs at least about 50% (more preferably at least 60%, and most preferably at least 70%) of incident IR radiation in the near-IR spectrum from 0.9 to 1.2 µm.

In the method of any of the immediately preceding five paragraphs, the IR energy may be directed toward only areas of the VIG assembly where the frit is provided, so that the IR energy is not directed toward a central portion of the VIG assembly distant from the frit.

In the method of any of the immediately preceding six paragraphs, the IR absorbing clamps cause areas of the first and/or second glass substrates proximate the frit to reach higher temperatures than areas of the first and second glass substrates at a central area of the VIG assembly distant from the frit.

In the method of any of the immediately preceding seven paragraphs, the first and second glass substrates may be thermally tempered, and after formation of the edge seal the first and second glass substrates may maintain at least about 65% of their respective temper strengths.

In the method of any of the immediately preceding eight paragraphs, the IR absorbing clamps may be of or include NiCr, stainless steel, or any other suitable IR absorbing material. For example, the IR absorbing clamps may comprise from about 45-80% Ni; from about 8-35% Cr; and from about 1-14% Fe.

In the method of any of the immediately preceding nine paragraphs, the frit may be a lead-free glass frit and/or solder glass frit.

In the method of any of the immediately preceding ten paragraphs, the frit may comprise by weight percentage: vanadium oxide from about 50% and 60%, barium oxide from about 15% to 33% weight, and zinc oxide from about 7-15%.

In the method of any of the immediately preceding eleven paragraphs, the IR absorbing clamps may be removed after formation of the edge seal and a gap between the first and second glass substrates evacuated to a pressure less than atmospheric pressure.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of making a vacuum insulating glass (VIG) window unit, the method comprising:
    having a VIG assembly including first and second substantially parallel spaced-apart glass substrates with a plurality of spacers therebetween, a frit for forming an edge seal being provided at least partially between the first and second glass substrates;
    providing a plurality of infrared (IR) absorbing clamps around a peripheral area of the VIG assembly, the IR absorbing clamps clamping the first and second glass substrates together and overlapping at least part of the frit for forming the edge seal;
    directing IR energy from at least one IR source toward the frit for forming the edge seal and toward the IR absorbing clamps during a process of melting the frit so as to form the edge seal, the IR absorbing clamps absorbing IR radiation from the at least one IR source and transferring energy to at least one of the glass substrates and to the frit in order to help melt the frit when forming the edge seal; and
    wherein the IR absorbing clamps are made of material that absorbs at least about 50% of incident IR radiation in the near-IR spectrum from 0.9 to 1.2 µm.

2. The method of claim 1, wherein the IR absorbing clamps directly contact at least one of the glass substrates.

3. The method of claim 1, wherein the IR absorbing clamps directly contact each of the first and second glass substrates.

4. The method of claim 1, wherein the IR absorbing clamps each have a width W at least twice as large as a width of the frit.

5. The method of claim 1, wherein the IR absorbing clamps are spring biased toward a closed position so that when attached to the VIG assembly the clamps hold the first and second glass substrates together during formation of the edge seal.

6. The method of claim 1, wherein the IR absorbing clamps are made of material that absorbs at least about 70% of incident IR radiation in the near-IR spectrum from 0.9 to 1.2 µm.

7. The method of claim 1, wherein the IR energy is directed toward only areas of the VIG assembly where the frit is provided, so that the IR energy is not directed toward a central portion of the VIG assembly.

8. The method of claim 1, wherein the IR absorbing clamps cause areas of the first and/or second glass substrates proximate the frit to reach higher temperatures than areas of the first and second glass substrates at a central area of the VIG assembly.

9. The method of claim 1, wherein the first and second glass substrates are thermally tempered, and after formation of the edge seal the first and second glass substrates maintain at least about 65% of their respective temper strengths.

10. The method of claim 1, wherein the frit is a lead-free glass frit and/or solder glass frit.

11. A method of making a vacuum insulating glass (VIG) window unit, the method comprising:
    having a VIG assembly including first and second substantially parallel spaced-apart glass substrates with a plurality of spacers therebetween, a frit for forming an edge seal being provided at least partially between the first and second glass substrates;
    providing a plurality of infrared (IR) absorbing clamps around a peripheral area of the VIG assembly, the IR absorbing clamps clamping the first and second glass substrates together and overlapping at least part of the frit for forming the edge seal;
    directing IR energy from at least one IR source toward the frit for forming the edge seal and toward the IR absorbing clamps during a process of melting the frit so as to form the edge seal, the IR absorbing clamps absorbing IR radiation from the at least one IR source and transferring energy to at least one of the glass substrates and to the frit in order to help melt the frit when forming the edge seal; and
    wherein the IR absorbing clamps comprise Ni and Cr.

12. The method of claim 11, wherein the IR absorbing clamps comprise from about 45-80% Ni; from about 8-35% Cr; and from about 1-14% Fe.

13. A method of making a vacuum insulating glass (VIG) window unit, the method comprising:

having a VIG assembly including first and second substantially parallel spaced-apart glass substrates with a plurality of spacers therebetween, a frit for forming an edge seal being provided at least partially between the first and second glass substrates;

providing a plurality of infrared (IR) absorbing clamps around a peripheral area of the VIG assembly, the IR absorbing clamps clamping the first and second glass substrates together and overlapping at least part of the frit for forming the edge seal;

directing IR energy from at least one IR source toward the frit for forming the edge seal and toward the IR absorbing clamps during a process of melting the frit so as to form the edge seal, the IR absorbing clamps absorbing IR radiation from the at least one IR source and transferring energy to at least one of the glass substrates and to the frit in order to help melt the frit when forming the edge seal; and wherein the IR absorbing clamps comprise stainless steel.

14. A method of making a vacuum insulating glass (VIG) window unit, the method comprising:

having a VIG assembly including first and second substantially parallel spaced-apart glass substrates with a plurality of spacers therebetween, a frit for forming an edge seal being provided at least partially between the first and second glass substrates;

providing a plurality of infrared (IR) absorbing clamps around a peripheral area of the VIG assembly, the IR absorbing clamps clamping the first and second glass substrates together and overlapping at least part of the frit for forming the edge seal;

directing IR energy from at least one IR source toward the frit for forming the edge seal and toward the IR absorbing clamps during a process of melting the frit so as to form the edge seal, the IR absorbing clamps absorbing IR radiation from the at least one IR source and transferring energy to at least one of the glass substrates and to the frit in order to help melt the frit when forming the edge seal; and wherein the frit comprises by weight percentage: vanadium oxide from about 50% and 60%, barium oxide from about 15% to 33% weight, and zinc oxide from about 7-15%.

15. A method of making a vacuum insulating glass (VIG) window unit, the method comprising:

having a VIG assembly including first and second substantially parallel spaced-apart glass substrates with a plurality of spacers therebetween, a frit for forming an edge seal being provided at least partially between the first and second glass substrates;

providing a plurality of infrared (IR) absorbing clamps around a peripheral area of the VIG assembly, the IR absorbing clamps clamping the first and second glass substrates together and overlapping at least part of the frit for forming the edge seal;

directing IR energy from at least one IR source toward the frit for forming the edge seal and toward the IR absorbing clamps during a process of melting the frit so as to form the edge seal, the IR absorbing clamps absorbing IR radiation from the at least one IR source and transferring energy to at least one of the glass substrates and to the frit in order to help melt the frit when forming the edge seal; and removing the IR absorbing clamps after formation of the edge seal and evacuating a gap between the first and second glass substrates to a pressure less than atmospheric pressure.

16. The method of claim 15, wherein the IR absorbing clamps are made of material that absorbs at least about 50% of incident IR radiation in the near-IR spectrum from 0.9 to 1.2 µm.

17. A method of making a vacuum insulating glass (VIG) window unit, the method comprising:

having a VIG assembly including first and second spaced-apart glass substrates with a plurality of spacers therebetween, a frit for forming an edge seal being provided at least partially between the first and second glass substrates;

providing at least one infrared (IR) absorbing element at a peripheral area of the VIG assembly so as to overlap at least part of the frit for forming the edge seal;

directing IR energy toward the frit for forming the edge seal and toward the IR absorbing element during a process of melting the frit so as to form the edge seal, the IR absorbing element absorbing IR radiation and transferring energy to at least one of the glass substrates and to the frit in order to help melt the frit when forming the edge seal;

wherein the at least one IR absorbing element is made of material that absorbs at least about 50% of incident IR radiation in the near-IR spectrum from 0.9 to 1.2 µm; and removing the at least one IR absorbing element after formation of the edge seal and evacuating a gap between the first and second glass substrates to a pressure less than atmospheric pressure in making the VIG window unit.

18. The method of claim 17, wherein the IR absorbing element has a width at least twice as large as a width of the frit.

19. The method of claim 17, wherein the IR absorbing element helps hold the first and second glass substrates together during formation of the edge seal.

20. The method of claim 17, wherein the IR absorbing element comprises a flat base, a sidewall, and a clamping portion, wherein the sidewall is provided between the flat base and the clamping portion.

* * * * *